(12) United States Patent
Chen et al.

(10) Patent No.: US 10,752,798 B2
(45) Date of Patent: Aug. 25, 2020

(54) ANTISTATIC GLOVES AND PROCESS FOR MAKING SAME

(71) Applicant: ALLEGIANCE CORPORATION, McGaw Park, IL (US)

(72) Inventors: Seong Fong Chen, Gelugor (MY); Wei Cheong Wong, Kulim (MY); Chii Yih Low, Bayan Lepas (MY)

(73) Assignee: Allegiance Corporation, Mcgaw Park, IL (US)

(*) Notice: Subject to any disclaimer, the term of this patent is extended or adjusted under 35 U.S.C. 154(b) by 45 days.

(21) Appl. No.: 14/963,764

(22) Filed: Dec. 9, 2015

(65) Prior Publication Data

US 2016/0160069 A1    Jun. 9, 2016

Related U.S. Application Data

(62) Division of application No. 11/811,641, filed on Jun. 11, 2007, now abandoned.

(51) Int. Cl.
| | | |
|---|---|---|
| *C09D 107/02* | (2006.01) |
| *B29C 41/14* | (2006.01) |
| *C08L 13/02* | (2006.01) |
| *C08L 7/02* | (2006.01) |
| *B29C 41/22* | (2006.01) |
| *B32B 25/14* | (2006.01) |
| *C08J 5/02* | (2006.01) |
| *C09D 109/04* | (2006.01) |
| *A41D 19/015* | (2006.01) |
| *A41D 31/26* | (2019.01) |

(52) U.S. Cl.
CPC ............ *C09D 107/02* (2013.01); *B29C 41/14* (2013.01); *B29C 41/22* (2013.01); *B32B 25/14* (2013.01); *C08J 5/02* (2013.01); *C08L 7/02* (2013.01); *C08L 13/02* (2013.01); *C09D 109/04* (2013.01); *A41D 19/015* (2013.01); *A41D 31/26* (2019.02); *B32B 2307/21* (2013.01); *C08J 2307/02* (2013.01); *C08J 2313/02* (2013.01)

(58) Field of Classification Search
CPC .................................................. C09D 107/02
See application file for complete search history.

(56) References Cited

U.S. PATENT DOCUMENTS

| | | | |
|---|---|---|---|
| 3,250,737 A | 5/1966 | Halper et al. |
| 3,285,869 A | 11/1966 | Ronay et al. |
| 3,565,870 A | 2/1971 | Hirokazu |
| 3,813,695 A | 6/1974 | Podell et al. |
| 3,846,365 A | 11/1974 | Berg et al. |
| 3,968,067 A | 7/1976 | Burke, Jr. |
| 3,971,746 A | 7/1976 | Hirai et al. |
| 3,988,275 A | 10/1976 | Satake et al. |
| 4,143,109 A | 3/1979 | Stockum |
| 4,452,879 A | 6/1984 | Fickes et al. |
| 4,463,120 A | 7/1984 | Collins et al. |
| 4,499,154 A | 2/1985 | James et al. |
| 4,575,476 A | 3/1986 | Podell et al. |
| 4,594,367 A | 6/1986 | Geissel et al. |
| 4,849,478 A | 7/1989 | Mori et al. |
| 5,039,750 A | 8/1991 | Miller et al. |
| 5,070,540 A | 12/1991 | Bettcher et al. |
| 5,073,365 A | 12/1991 | Katz et al. |
| 5,084,514 A | 1/1992 | Szczechura et al. |
| 5,088,125 A | 2/1992 | Ansell et al. |
| 5,155,163 A | 10/1992 | Abeywardena et al. |
| 5,254,635 A | 10/1993 | Stevenson et al. |
| 5,278,264 A | 1/1994 | Spaleck et al. |
| 5,284,607 A | 2/1994 | Chen |
| 5,395,666 A | 3/1995 | Brindle |
| 5,405,666 A | 4/1995 | Brindle |
| 5,459,880 A * | 10/1995 | Sakaki ............... B29C 41/14 |
| | | | 2/161.6 |
| 5,486,322 A | 1/1996 | Fuchs |
| 5,545,451 A | 8/1996 | Haung et al. |
| 5,564,127 A | 10/1996 | Manne |
| 5,670,263 A | 9/1997 | Gazeley |
| 5,741,943 A | 4/1998 | Bryant et al. |

(Continued)

FOREIGN PATENT DOCUMENTS

| | | |
|---|---|---|
| DE | 2135266 A1 | 1/1973 |
| EP | 0854174 A1 | 7/1998 |

(Continued)

OTHER PUBLICATIONS

Blackley D.C., High Polymer Latices, 1966, vol. 1, Maclaren & Sons Ltd., Palmerton Publishing Co. Inc., New York, pp. 336-337.
David L.N., et al., Lehninger Principles of Biochemistry, 2004, Fourth Edition, Chapter 10, Freeman W.H., pp. 344-345.
Japanese Office Action for Japanese Patent Application No. 2010-550898, dated Sep. 10, 2013.
Krylova Irina, Final Office Action dated Jul. 10, 2015 for U.S. Appl. No. 11/811,641, 13 pages.
Krylova Irina, Non-Final Office Action dated Dec. 18, 2014 for U.S. Appl. No. 11/811,641, 25 pages.

(Continued)

*Primary Examiner* — Irina Krylova
(74) *Attorney, Agent, or Firm* — Arent Fox LLP

(57) ABSTRACT

The present invention is directed to antistatic elastomeric articles and methods of making the same. The articles can be single layered or multilayered. The single layered articles possess desirable antistatic properties and desirable properties of comfort and feel. The multilayered articles have an outermost layer/surface that possesses desirable antistatic properties and an innermost layer/surface that exhibits desirable properties of comfort and feel. In preferred embodiments, the elastomeric articles are made form a nitrile/natural rubber blend. Articles of the present invention have antistatic properties measured as having a surface resistivity below about $10^{14}$ Ω/sq and a static decay time of less than about 60 seconds.

10 Claims, 4 Drawing Sheets

(56) References Cited

U.S. PATENT DOCUMENTS

| | | |
|---|---|---|
| 5,742,943 A | 4/1998 | Chen |
| 5,792,531 A | 8/1998 | Littleton et al. |
| 5,877,244 A | 3/1999 | Hoover et al. |
| 5,910,567 A | 6/1999 | Tanaka et al. |
| 5,993,923 A | 11/1999 | Lee |
| 5,997,969 A | 12/1999 | Gardon |
| 6,000,061 A | 12/1999 | Taneja et al. |
| 6,019,922 A | 2/2000 | Hassan et al. |
| 6,021,524 A | 2/2000 | Wu et al. |
| 6,075,073 A | 6/2000 | McGlothlin et al. |
| 6,143,416 A | 11/2000 | Brindle et al. |
| 6,263,249 B1 | 7/2001 | Stewart et al. |
| 6,329,444 B1 | 12/2001 | McGlothlin et al. |
| 6,365,278 B1 | 4/2002 | Hoerner et al. |
| 6,391,409 B1 | 5/2002 | Yeh et al. |
| 6,560,782 B2 | 5/2003 | Hourihan et al. |
| 6,566,435 B1 | 5/2003 | Teoh et al. |
| 6,582,788 B2 | 6/2003 | Yeh |
| 6,618,861 B2 | 9/2003 | Saks et al. |
| 6,673,404 B1* | 1/2004 | Yeh ................. B29C 41/003 428/35.7 |
| 6,737,469 B2 | 5/2004 | Takamura et al. |
| 6,746,562 B2 | 6/2004 | Chino et al. |
| 6,764,731 B2 | 7/2004 | Savoca et al. |
| 6,794,475 B1 | 9/2004 | Bialke et al. |
| 6,828,387 B2 | 12/2004 | Wang et al. |
| 6,887,542 B2 | 5/2005 | Conley et al. |
| 7,037,579 B2 | 5/2006 | Hassan et al. |
| 7,335,807 B2 | 2/2008 | Hochgesang |
| 7,566,502 B1 | 7/2009 | Chen et al. |
| 8,062,755 B2 | 11/2011 | Chen et al. |
| 8,110,266 B2 | 2/2012 | Chen et al. |
| 8,835,014 B2 | 9/2014 | Wang et al. |
| 9,080,025 B2 | 7/2015 | Chen et al. |
| 2002/0002227 A1 | 1/2002 | Porter et al. |
| 2002/0015812 A1 | 2/2002 | Littleton et al. |
| 2002/0029402 A1 | 3/2002 | Yeh |
| 2002/0066975 A1 | 6/2002 | Elvig |
| 2002/0133864 A1 | 9/2002 | Saks et al. |
| 2002/0173563 A1 | 11/2002 | Wang et al. |
| 2003/0037530 A1 | 2/2003 | Zhu |
| 2003/0050383 A1 | 3/2003 | Oppenheimer-Stix et al. |
| 2004/0071909 A1 | 4/2004 | McGlothlin et al. |
| 2004/0091504 A1 | 5/2004 | Hamann |
| 2004/0091557 A1 | 5/2004 | Hamann |
| 2004/0105943 A1 | 6/2004 | Hoerner et al. |
| 2004/0126604 A1 | 7/2004 | Wang et al. |
| 2004/0169317 A1 | 9/2004 | Wang et al. |
| 2004/0253459 A1 | 12/2004 | Triebes et al. |
| 2005/0031884 A1 | 2/2005 | Koide et al. |
| 2005/0268374 A1* | 12/2005 | Mattesky ......... A41D 19/01523 2/164 |
| 2006/0010565 A1 | 1/2006 | Teoh et al. |
| 2006/0026737 A1* | 2/2006 | Chen ................. A61B 42/10 2/161.7 |
| 2006/0059604 A1 | 3/2006 | Lai et al. |
| 2006/0070167 A1 | 4/2006 | Eng et al. |
| 2006/0099237 A1 | 5/2006 | Modak et al. |
| 2006/0108718 A1 | 5/2006 | Miyamoto et al. |
| 2006/0134613 A1 | 6/2006 | Martin et al. |
| 2006/0141186 A1 | 6/2006 | Janssen et al. |
| 2006/0222688 A1* | 10/2006 | Weiss ................. A41D 19/0058 424/443 |
| 2006/0257674 A1 | 11/2006 | Lipinski et al. |
| 2008/0190322 A1 | 8/2008 | Chen et al. |
| 2009/0234064 A1 | 9/2009 | Wang et al. |
| 2009/0255033 A1 | 10/2009 | Chen et al. |
| 2011/0178234 A1 | 7/2011 | Wang et al. |
| 2012/0121838 A1 | 5/2012 | Chen et al. |

FOREIGN PATENT DOCUMENTS

| | | |
|---|---|---|
| EP | 1709879 A2 | 10/2006 |
| EP | 1935925 A1 | 6/2008 |
| GB | 2270618 A | 3/1994 |
| GB | 2411101 A | 8/2005 |
| JP | S5150340 A | 5/1976 |
| JP | H059529 U | 2/1993 |
| JP | H0666688 U | 9/1994 |
| JP | H1161527 A | 3/1999 |
| JP | 2001523759 A | 11/2001 |
| JP | 2002522272 A | 7/2002 |
| JP | 2002309043 A | 10/2002 |
| JP | 2005519144 A | 6/2005 |
| JP | 2006502024 A | 1/2006 |
| JP | 2007501144 A | 1/2007 |
| JP | 2007514575 A | 6/2007 |
| JP | 2009209229 A | 9/2009 |
| JP | 6340758 B2 | 6/2018 |
| WO | 9213497 A1 | 8/1992 |
| WO | 9420574 A2 | 9/1994 |
| WO | 9730839 A1 | 8/1997 |
| WO | 9829484 A1 | 7/1998 |
| WO | 0009320 A1 | 2/2000 |
| WO | 0025840 A1 | 5/2000 |
| WO | 0190236 A1 | 11/2001 |
| WO | 02090430 A1 | 11/2002 |
| WO | 2004037305 A1 | 5/2004 |
| WO | 2004093690 A1 | 11/2004 |
| WO | 2004105525 A1 | 12/2004 |
| WO | 2005068186 A1 | 7/2005 |
| WO | 2008097643 A2 | 8/2008 |
| WO | 2009114788 A2 | 9/2009 |

OTHER PUBLICATIONS

Mahmoud Abdei-Goad, et al., "Rheological Properties of 1,4-Polyisoprene over a Large Molecular Weight Range," Macromolecules, 2004, vol. 37 (21), pp. 8135-8144.

Mausser R.F. The Vanderbilt Latex Handbook, 3rd Edition, 1987, p. 109, R.T. Vanderbilt Company, Inc.

Natural Rubber Science and Technology, A.D. Roberts, ed., Oxford University Press, 1988, pp. 105-107.

Ngal K.L., et al., "Terminal Relaxation and Diffusion of Entangled Three-Arm Star Polymers: Temperature and Molecular Weight Dependencies," Journal of Polymer Science Part B: Polymer Physics, 1997, vol. 35 (15), pp. 2503-2510.

Product data sheet of NATSYN 2200 by GoodYear.

Tony Whelan, Polymer Technology Dictionary, 1994, Chapman & Hall, London, UK, p. 270.

ASTM Standard D 1076-02. "Standard Specification for Rubber—Concentrated, Ammonia Preserved, Creamed, and Centrifuged Natural Latex," published in Sep. 2002. pp. 218-219.

Aughenbaugh, Walter, Non-Final Office Action dated Apr. 11, 2016 for U.S. Appl. No. 14/730,635, 16 pages.

Aughenbaugh, Walter., Office Action dated May 8, 2014 in U.S. Appl. No. 13/347,357,35 pages.

Chen F. B. "Synthetic Polyisoprene Latex," 3rd International Rubber Glove Conference & Exhibition. Sep. 12-14, 2006, Kuala Lumpur, Malaysia. pp. 1-19.

European Search Report and Search Opinion for European Patent Application No. 08725350.6, dated Apr. 19, 2010, 6 pages.

European Search Report and Search Opinion for European Patent Application No. 13150983.8, dated Mar. 18, 2013, 7 pages.

Genencor Fact Sheet, "Synthetic Polyisoprene", downloaded on Jan. 26, 2010 from the internet: http://daniscosugar.com/cms/connect/genencor/products_and_services/business_devlopment/biochemicals/in_focus_bioisoprene/bioisoprene_en.htm, 2008, 7 pages.

Handbook of preservatives by Michael Ash, 2004.

Henderson P., "From Isoprene monomer to synthetic polyisoprene latex and its uses," Presentation at Latex 2001, Dec. 4-5, 2001, Munich, Germany. pp. 77-90.

Henderson P., "Isoprene Monomer to Synthetic Polyisoprene Latex," International Latex Conference 2000, Jul. 25-26, 2000, Akron, Ohio, US, 8 pages.

Ho C.C. and Khew M.G., "Surface characterization of chlorinated unvulcanised natural rubber latex films," International Journal of Adhesion and Adhesives, 1999, vol. 19 (5), pp. 387-398.

(56) References Cited

OTHER PUBLICATIONS

International Search Report and Written Opinion for International Application No. PCT/US2008/001705, dated Dec. 5, 2008, 5 pages.
International Search Report for Application No. PCT/US09/37130, dated May 18, 2009, 1 page.
Kraton. Cariflex(tm) IR latex compared to natural rubber latex, Jul. 2012, 15 pages.
Kraton, Cariflex(TM) Polysioprene Latex: Pure Performance and Comfort, 2011. 2 pages.
Kraton IR Polymers: The Clear Alternative, 2002. 2 pages.
Office Action in corresponding Canadian Patent Application No. 2716805 dated Jul. 4, 2016.
Office Action in corresponding Chinese Patent Application No. 2015-10117745 dated Jun. 27, 2016.
Office Action dated Dec. 10, 2015 in corresponding European Patent Application No. 13150983.8, 3 pages.
Patent Examination Report No. 2, mailed in Australian Patent Application No. 2013204273 dated May 14, 2015, 3 pages.
"Polyisoprene" Entry from Hawley's Condensed Chemical Dictionary, 14th Edition, © 2002, John Wiley & Sons, Inc. 1 page.

Substantive Examination Adverse Report and Search report dated Mar. 15, 2016 for Malaysian Application No. PI2013003026, 3 pages.
Supplementary European Search Report for Application No. EP09721175, dated Feb. 15, 2011, 2 pages.
Yildirim Erbil H., "Vinyl Acetate Emulsion Polymerization and Copolymerization with Acrylic Monomers," Chapter 7 Experimental Determination of Latex Properties, published in 2000 by CRC Press, 1 page.
European Search Report for Application No. EP13150983, dated Mar. 12, 2013, 3 pages.
Extended European Search Report for Application No. 18151933.1, dated Jul. 26, 2018, 6 pages.
International Search Report for Application No. PCT/US08/01705, dated Dec. 5, 2008, 1 page.
Examination Report for Malaysian Application No. MYPI2013003025, dated Nov. 30, 2018, 5 pages.
Office Action in corresponding Japanese Patent Application No. 2017-106560 dated Aug. 7, 2018, 5 pages.

* cited by examiner

100

400

ANTISTATIC GLOVES AND PROCESS FOR MAKING SAME

CROSS REFERENCE TO RELATED APPLICATION

This application is a divisional of U.S. patent application Ser. No. 11/811,641, filed Jun. 11, 2007, the disclosure of which is hereby incorporated by reference in its entirety.

FIELD OF THE INVENTION

The invention relates to the field of elastomeric articles such as gloves. In particular, the invention pertains to elastomeric gloves that can be used in industrial and medical applications wherein the elastomeric gloves exhibit desirable static resistivity or antistatic properties while retaining desirable softness and feel properties.

BACKGROUND OF THE INVENTION

Elastomeric articles, such as gloves, are well known in the industrial and medical fields for their ability to form a protective chemical, microbial, and physical barrier between the external environment and the user's skin. Various physical and chemical properties of gloves, and the elastomers they are made from, are desirable for a variety of applications. In certain fields where articles such as gloves and finger cots are widely used, such as electronic assembly, desirable properties include comfort and softness of feel, maintenance of tactile sensitivity and surface static resistivity.

The advantages of elastomeric articles such as gloves with antistatic properties are also known. In certain fields such as handling sensitive electronic equipment, the use of gloves and/or finger cots with antistatic properties is mandatory to avoid static discharge that can damage electronic components. Polyvinyl chloride (PVC), acrylonitrile-butadiene (nitrile) and polyurethane rubbers have been used for antistatic gloves.

The use of natural rubber is associated with good softness and tactile sensitivity properties. However, natural rubber does not exhibit good static resistivity. To compensate for this deficiency, conductive carbon black could be added to natural rubber latex. However, a concern with such a black-colored article is shedding of the conductive black particles which can cause contamination problems. Moreover, carbon black would darken and blacken the resulting article which is aesthetically unappealing and potentially visually distracting to the user and may interfere with the precision of handling instruments.

U.S. Pat. No. 6,794,475 to Bialke et al. (hereinafter "Bialke et al.") describes antistatic polymers, blends and articles. Bialke et al. describes polymeric blends containing a macromer-modified latex and a secondary latex. The macromer-modified latex may be an acrylonitrile-based co-polymer and the secondary latex may be natural rubber. Articles formed from these polymeric blends allegedly demonstrate improved electrostatic properties. Specifically, Bialke et al. provides examples of co-polymers of methoxypolyethylene glycol methacrylate and acrylonitrile used in blended compositions containing one or more latex components having static resistive properties. However, Bialke et al. achieves antistatic properties by modifying a latex component with a macromer and thereby forming co-polymers containing macromers such as methoxypolyethylene glycol methacrylate. Bialke et al. does not describe blending unmodified latex components, specifically the combination of nitrile rubber latex with natural rubber latex. Nor does Bialke et al. recognize the antistatic properties of such a combination.

U.S. Pat. No. 5,459,880 to Sakaki et al. (hereinafter "Sakaki et al.") describes gloves having a plurality of different types of rubbers successively laminated together. Sakaki et al. describes the lowermost layer as being a natural rubber layer and a top surface layer as being an oil-resistant rubber layer, such as a acrylonitrile-butadiene rubber layer. Each of these layers contains only one particular type of latex. Sakaki et al. does not disclose latex layers consisting of a blend of more than one type of latex (e.g., nitrile rubber latex combined with natural rubber latex). In addition, the process described by Sakaki et al. includes forming a lower layer and immersing the lower layer into an additional latex composition immediately thereafter or while the lower layer still contains water so as to improve the adhesion between the layers of different types of latex.

Problems associated with the manufacture of multilayered articles with different elastomer layers laminated to one another include chemical incompatibility resulting in delamination between layers and difficulty in controlling the amount of water in the latex gel and the degree of latex gelling. When these factors are not properly controlled, the layers may delaminate. To reduce delamination of the layers, Sakaki et al. relies on the ability of the rubber components of both layers to mix with each other at the interface so that the rubber molecules are entangled with one another. Such interfacial mixing could only occur if the first layer is not fully gelled or set (i.e., it is dependent on the degree or extent of gelling or setting of the first layer). The degree of gelling is dependent on the concentration of coagulant, the solids content of the latex, temperature and time, and is therefore difficult to control. Sakaki et al. does not describe increasing the chemical compatibility of two different layers by blending the two different types of latex prior to forming an article and thus reducing delamination.

There is a need in the field of elastomeric articles for an improved manufacturing technique which can produce a rubber-containing article that exhibits good antistatic or surface resistivity properties. There is a further need for multilayered rubber-containing articles wherein additional natural rubber layer(s) can be formed that afford the advantage of softness of feel and comfort on the skin-contacting layer while maintaining good adherence between the layers.

SUMMARY OF THE INVENTION

The present invention encompasses rubber elastomeric articles with desirable static resistivity or antistatic properties and methods of making same. It has been surprisingly discovered that rubber-containing elastomeric articles, e.g., gloves, can be manufactured which exhibit desirable antistatic properties without requiring the addition or incorporation of secondary additives into the process. The present invention provides a balance between maintaining effective and desirable antistatic properties of the outermost surface/layer of the elastomeric article while at the same time affording the user desirable comfort and feel properties on the innermost surface/layer.

In one embodiment, the elastomeric article comprises a single layer of rubber. In such embodiments, a non-leachable polymeric antistatic agent with desirable antistatic properties is blended with an elastomeric material with desirable comfort and feel properties. It is the inventors' surprising discovery that an elastomeric article made from such a blend exhibits surface resistivity and static decay properties that are more similar to those of an article made from a non-leachable polymeric antistatic agent than a weighted average would predict. In a preferred embodiment, the non-leachable polymeric antistatic agent comprises about 80% w/w and the elastomeric material comprises about 20% w/w. In another preferred embodiment, the non-leachable polymeric antistatic agent is nitrile rubber or polyurethane and the elastomeric material is natural rubber or polyisoprene.

In another embodiment, the elastomeric article comprises more than one layer of rubber. In such embodiments, the outermost layer of the article is composed of a majority of a non-leachable polymeric antistatic agent with desirable antistatic properties. The innermost layer of the article is composed of a majority of an elastomeric material with desirable comfort and feel properties. Each layer comprises a minor amount of the polymer that is the major component in the adjacent layer. In a preferred embodiment, the non-leachable polymeric antistatic agent is nitrile rubber or polyurethane and the elastomeric material is natural rubber or polyisoprene.

The invention also provides for an improved manufacturing process for multilayered rubber-containing elastomeric articles such as gloves. It has further surprisingly been discovered that advantageous interlayer adherence based on chemical compatibility can be accomplished by mutually combining minor amounts of latex of adjacent layers into the predominant latex of each. It has also been found that strong interlayer adherence results can be accomplished for antistatic rubber-containing articles while at the same time achieving good tactile sensitivity of the article. The present invention provides a balance between chemical compatibility and adherence between multiple layers of differing compositions of rubbers and substantially maintains the effective and desirable antistatic properties of the outermost layer while at the same time affording the user the desirable comfort and feel properties associated with the innermost layer.

In a specific embodiment, a multilayered elastomeric article of the invention is made by the process comprising: a) preparing a first blended latex composition for the outermost layer by mixing a major amount of the non-leachable polymeric antistatic agent with a minor amount of the elastomeric material; b) preparing a second blended latex composition for the innermost layer by mixing a minor amount of the non-leachable polymeric antistatic agent with a major amount of the elastomeric material; wherein said mixing is performed prior to the latex gelling; and c) forming a molded article wherein one layer is formed from said first blended latex composition and a directly adjacent layer is formed from said second blended latex composition. In more specific embodiments, the major polymer component in each layer comprises about 80% w/w and the minor polymer component comprises about 20% w/w.

DETAILED DESCRIPTION OF THE INVENTION

Figure 1:
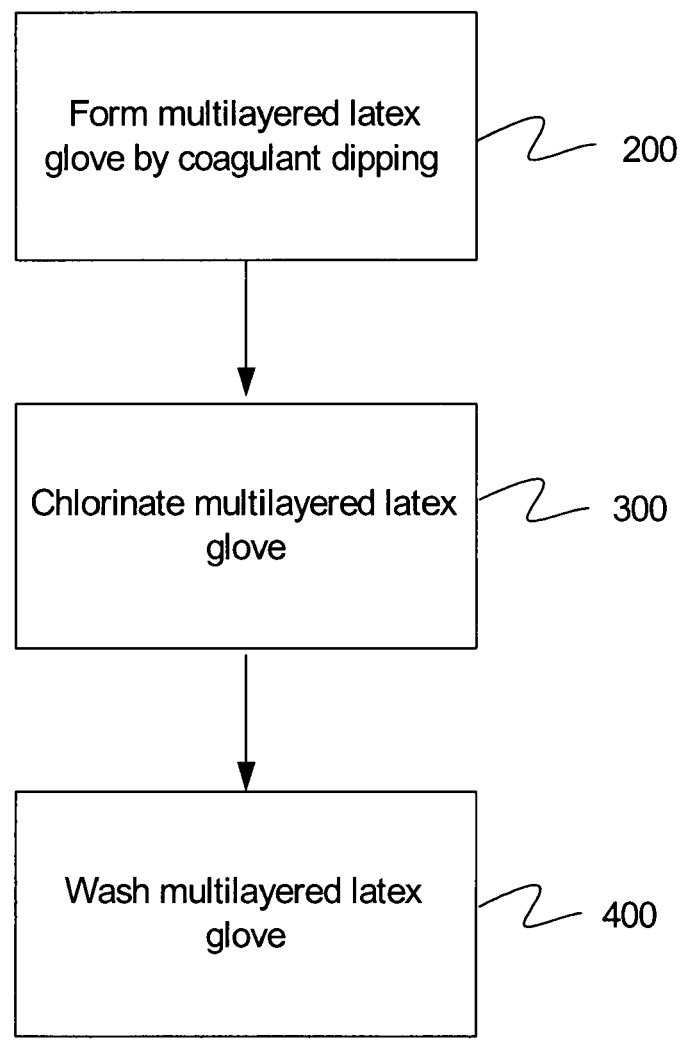
FIG. 1 illustrates an exemplary embodiment of a process for making a multilayered latex molded article.
Figure 2:
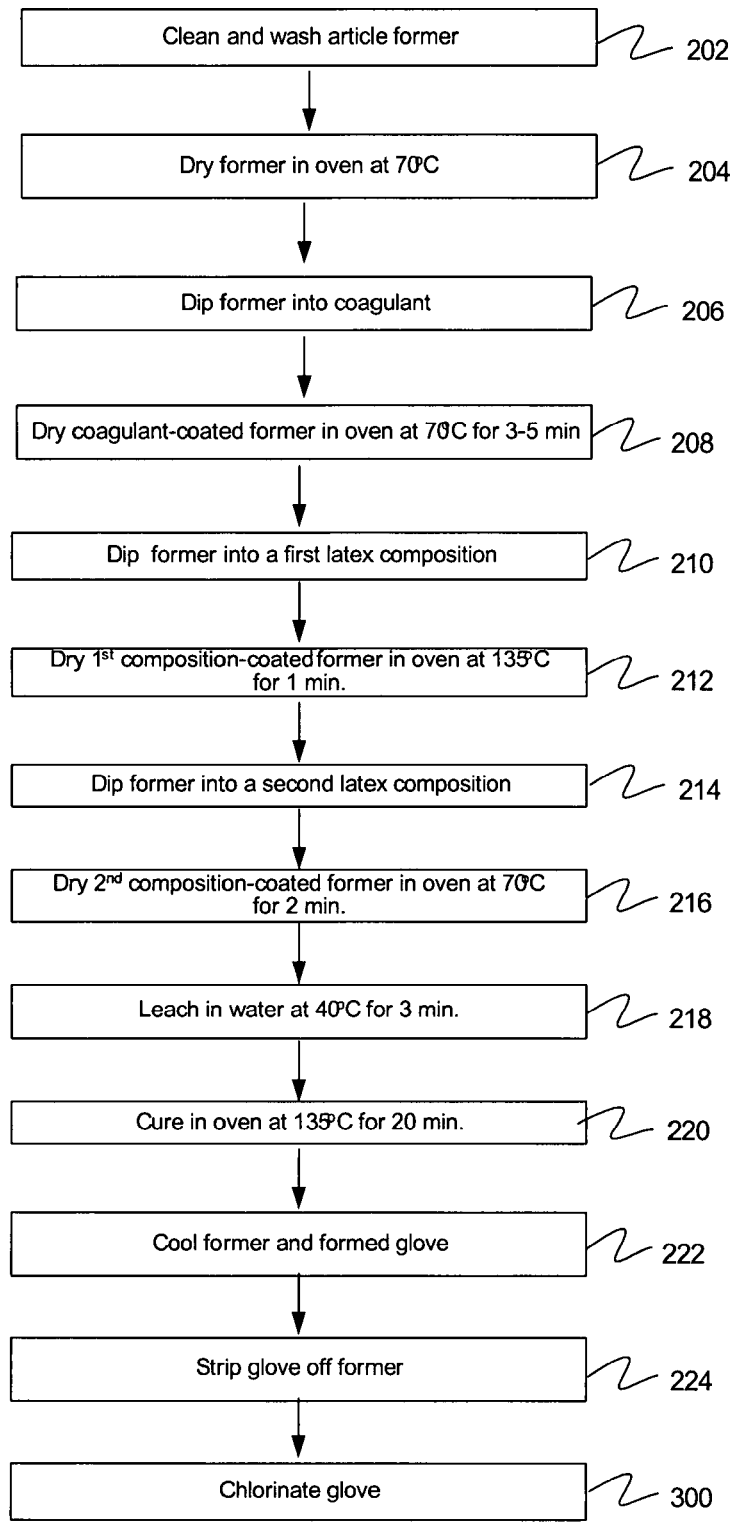
FIG. 2 illustrates an exemplary embodiment of a process for forming a multilayered latex molded article.
Figure 3:
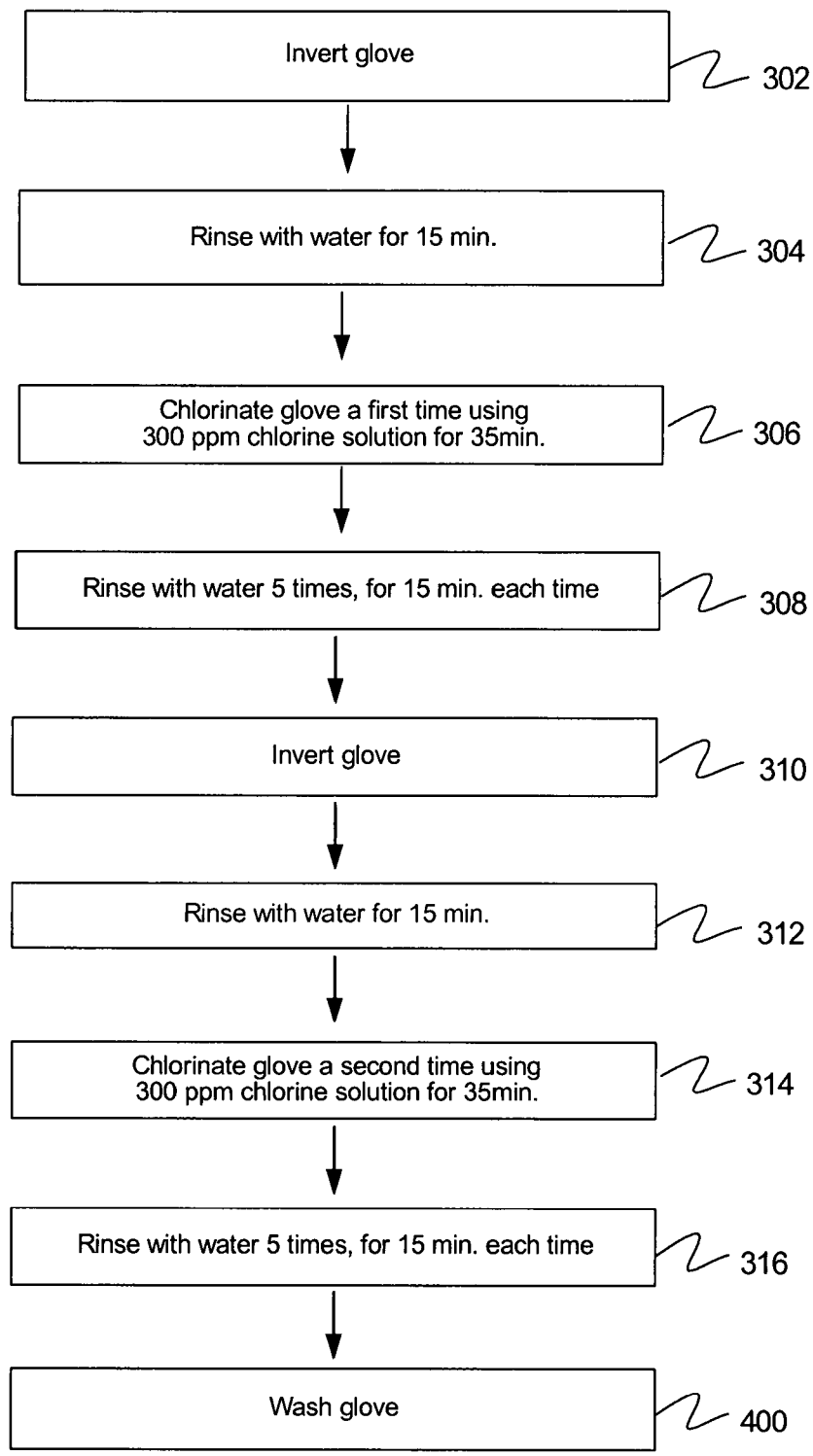
FIG. 3 illustrates an exemplary embodiment of a process for chlorinating a multilayered latex molded article.
Figure 4:
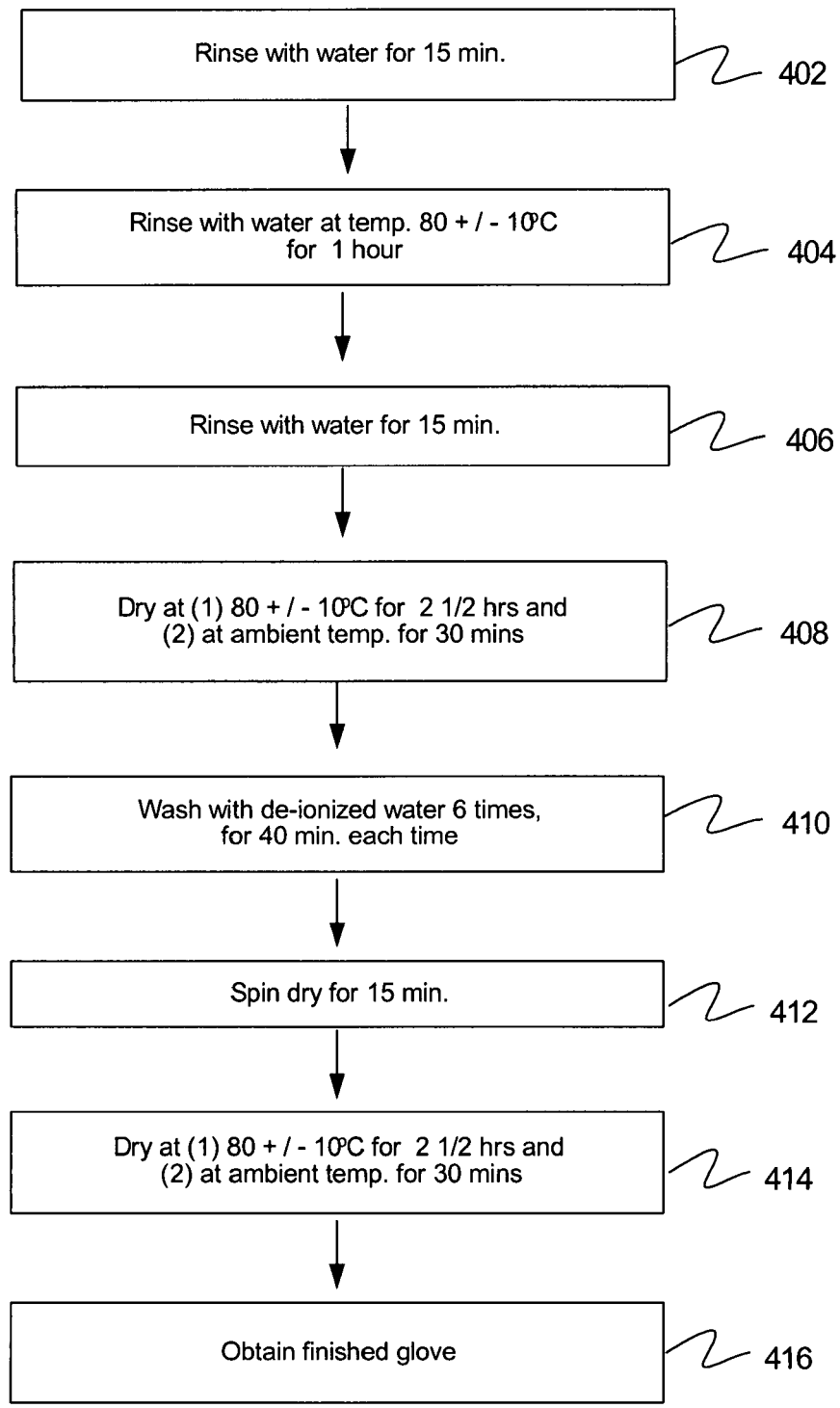
FIG. 4 illustrates an exemplary embodiment of a process for washing a chlorinated multilayered latex molded article.

The elastomeric articles of the present invention display desirable antistatic properties while also having desirable comfort and feel. In one embodiment, the elastomeric articles of the present invention display desirable antistatic properties on the outermost surface and/or layer of the article while having desirable comfort and feel properties on the innermost skin-contacting surface/layer of the article. This is accomplished by using blends of polymers that each have desirable properties, e.g., good surface resistivity and static decay times (i.e., non-leachable polymeric antistatic agent) and good comfort and feel properties (i.e., elastomeric material). In one embodiment, the blended polymers are used to make a single layer elastomeric article. In another embodiment, the blended polymers are used to make a multilayer elastomeric article. In such embodiments, the outermost surface/layer is comprised of a majority of the non-leachable polymeric antistatic agent with a minor amount of the elastomeric material. The innermost surface/layer is comprised of a majority of the elastomeric material with a minor amount of the non-leachable polymeric antistatic agent.

As used herein, the term "antistatic" as used to define the properties associated with the inventive elastomeric articles refers to a material having a surface resistivity of about $10^9$ Ω/sq to about $10^{14}$ Ω/sq (as measured according to ASTM D257-99) and a static decay time of less than about 60 seconds (as measured by MIL-STD-3010A Test Method 4046—Electrostatic Properties). Surface resistivity and volume resistivity are as defined in ASTM D257 and are measured at a relative humidity of 12+/−3% and a temperature of 22+/−2° C. Static decay time (SDT) is as defined in MIL-PRF-81705D. The surface resistivity, volume resistivity, and SDT of each glove sample were determined by averaging the values measured for three pieces (specimens) of each glove sample.

Ultimate elongation and modulus at 500% elongation are defined and measured in accordance with ASTM D412-98a.

As used herein, the term "major" or "majority" with respect to the overall composition of rubber is meant to indicate an ingredient that is present in an amount greater than the combination of remaining ingredients within the given composition. As used herein, the terms "minor" or "minority" with respect to the overall composition of rubber is meant to indicate an ingredient that is present in an amount that is less than the amount of at least one other ingredient within the given composition.

The antistatic elastomeric articles of the present invention with desirable surface resistivity and static decay times are particularly useful in applications where control of static electricity is important, such as in computer and electronic assembly techniques. While any elastomeric article can be made using the methods of the present invention, in preferred embodiments, the elastomeric articles are gloves or finger cots.

The elastomeric articles of the invention are made from blends of non-leachable polymeric antistatic agents with desirable surface resistivity and static decay times and elastomeric materials with desirable comfort and feel properties in either a single layer or multilayer form. Non-leachable polymeric antistatic agents can be both ionic (e.g., polybetaine and quaternary polysalts) and nonionic (e.g., nitrile rubber and polyvinyl chloride). Examples of non-leachable polymeric antistatic agents with desirable surface resistivity and static decay times include, but are not limited to, nitrile rubber, polyurethane, polyvinyl chloride, epichlorohydrin rubber, EPDM-polyaniline copolymer, polyether, polyalkylene oxide, polyalkylene glycol, polybetaine, polyacetylene, polyaniline, copolyesteramide, polyetheramide, polyetheresteramide block copolymer, polythiophene, polyparaphenylene, polyvinyl carbazole, polyglycol diglycidyl ether, polypyrrole, polyfuran, polybenzene, polyphenylene sulfide, salts of polyacrylic acid, polymer electrolyte/ionomers, quaternary polysalts, and ammonium polyphosphate. Examples of elastomeric materials with desirable comfort and feel properties include, but are not limited to, natural rubber, polyisoprene, polychloroprene, plasticized polyvinyl chloride, polybutadiene, butyl rubber, EPD, polyacrylic rubber, polyurethane, halogenated butyl rubber, and styrene-containing block copolymers (e.g., SIS, SEBS). In preferred embodiments, the non-leachable polymeric antistatic agent is nitrile rubber or polyurethane and the elastomeric material is natural rubber or polyisoprene.

The art will appreciate that "nitrile rubber" is a broad class of polymers, and that nitrile rubber compositions may be greatly varied. One embodiment of the present invention contemplates the use of carboxylated nitrile rubber latex. Another embodiment of the present invention contemplates the use of carboxylated nitrile rubber latex composed of between about 25% and about 40% acrylonitrile, between about 54% and about 73% butadiene and between about 2% and about 6% carboxylic acid. In another embodiment of the present invention, the carboxylic acid is methacrylic acid. In yet another embodiment of the present invention, the carboxylated nitrile rubber latex is composed of about 39% acrylonitrile, about 58% butadiene, and about 3% carboxylic acid. In yet another embodiment of the present invention, the carboxylated nitrile rubber latex is composed of about 39% acrylonitrile, about 55% butadiene, and about 6% carboxylic acid. These illustrative embodiments are in no way intended to limit to the recited compositions the scope of nitrile rubber contemplated for use in the present invention.

The art will appreciate that "polyurethane" is a broad class of polymers, and that polyurethane compositions may be greatly varied to achieve varying physical properties. Thus, polyurethanes may broadly be characterized as "polymeric antistatic agents" and/or "elastomeric materials", depending on their chemical composition and desired physical properties. For example, a polyurethane made from a polyester diol, an amine-based chain extender, and a neutralized ionomer may be expected to possess antistatic properties. One of ordinary skill in the art would be able to vary the composition of a polyurethane to achieve a polymer with antistatic properties and/or desirable comfort and feel properties, although the inventors believe that the same polyurethane will likely not serve as both components of a single embodiment of the composition. That is, one of ordinary skill in the art would be able to select a particular polyurethane either as a suitable polymeric antistatic agent based on its conductivity or as a suitable elastomeric material based on its desirable comfort and feel properties. The above example in no way limits the scope of polyurethanes contemplated for use in the present invention.

When making a single layer elastomeric article of the invention or the outer layer of a multilayer elastomeric article of the invention, a polymer blend containing a major amount of a non-leachable polymeric antistatic agent and a minor amount of elastomeric material is used. The blend is used to manufacture the entire single layer article or to manufacture the outermost layer of the multilayered article. Any means of blending can be used, including, but not limited to, solvent-based blending, melting block blending and latex blending. In one embodiment, the latex composition for the blend comprises a non-leachable polymeric antistatic agent in an amount from about 51% to about 95%, and an elastomeric material in an amount of from about 49% to about 5% of the total blended latex composition. Preferably, the latex composition for the blend comprises a non-leachable polymeric antistatic agent in an amount from about 60% to about 90%, and an elastomeric material in an amount of from about 40% to about 10% of the total blended latex composition. More preferably, the latex composition for the blend comprises a non-leachable polymeric antistatic agent in an amount from about 65% to about 85%, and an elastomeric material in an amount of from about 35% to about 15% of the total blended latex composition. In a specific embodiment, the latex composition for the blend comprises a non-leachable polymeric antistatic agent in an amount of about 80%, and an elastomeric material in an amount of about 20% of the total blended latex composition. The non-leachable polymeric antistatic agent component may be a single polymer or may itself be a blend of more than one non-leachable polymeric antistatic agent. Similarly, the elastomeric material component may be a single polymer or a blend of more than one elastomeric material.

In embodiments where a multilayered elastomeric article is made, the innermost skin-contacting layer of the article may be comprised of a majority of an elastomeric material with desirable comfort and feel properties. Thus, the latex composition used to prepare the innermost layer may be comprised of an elastomeric material in an amount from about 51% to about 95%, and a non-leachable polymeric antistatic agent in an amount of from about 49% to about 5% of the total blended latex composition. Preferably, the innermost layer latex composition may be comprised of an elastomeric material in an amount from about 60% to about 90%, and a non-leachable polymeric antistatic agent in an amount of from about 40% to about 10% of the total blended latex composition. More preferably, the innermost layer latex composition may be comprised of an elastomeric material in an amount from about 65% to about 85%, and a non-leachable polymeric antistatic agent in an amount of from about 35% to about 15% of the total blended latex composition. In a specific embodiment, the innermost layer latex composition may be comprised of an elastomeric material in an amount of about 80%, a non-leachable polymeric antistatic agent in an amount of about 20% of the total blended latex composition. The non-leachable polymeric antistatic agent component may be a single polymer or may itself be a blend of more than one non-leachable polymeric antistatic agent. Similarly, the elastomeric material component may be a single polymer or a blend of more than one elastomeric material.

It is desirable that the antistatic elastomeric articles of the invention have a surface resistivity preferably less than about $10^{14}$ $\Omega$/sq, more preferably less than about $8 \times 10^{13}$ $\Omega$/sq, and most preferably less than about $5 \times 10^{13}$ $\Omega$/sq. It is also desirable that the antistatic elastomeric articles of the invention have a static decay time preferably less than about 60 seconds, more preferably less than about 40 seconds, and most preferably less than about 30 seconds. It is also desirable that the antistatic elastomeric articles of the invention have a modulus at 500% elongation preferably less than about 10 MPa, more preferably less than about 7 MPa, and most preferably less than about 5 MPa.

Process of Making Antistatic Gloves

In embodiments where the elastomeric article is a single layer glove, any known method known in the art can be used to make the glove providing that the polymer blends described above are used. For example, the single latex dip used for single layer gloves is described in D. C. Blackley, Chapter 17 "Latex-dipping processes" in *Polymer Latices: Science and Technology* $2^{nd}$ edition Volume 3, Chapman & Hall London 1997 (incorporated by reference in its entirety).

In embodiments where the elastomeric article is a multi-layered glove, a standard coagulant dipping process well known to be used in the manufacture of medical examination and surgical gloves can be used. The standard process can be readily modified to apply multiple latex dips as compared to the ordinary single latex dip used for single layer gloves (D. C. Blackley, supra).

The process may be illustrated according to the following non-limiting example of preparing an antistatic glove. To prepare an antistatic glove according to the invention, a first latex blend composition of a majority of a non-leachable polymeric antistatic agent (e.g., nitrile rubber) and a second latex blend composition of a majority an elastomeric material (e.g., natural rubber) are prepared. The first latex blend composition comprises a blend of a non-leachable polymeric antistatic agent (e.g., nitrile rubber) and an elastomeric material (e.g., natural rubber), wherein the former polymer comprises a majority of the first latex blend composition. The second latex blend composition comprises a blend of the same polymers described above, however, the elastomeric material comprises a majority of the second latex blend composition. A clean latex article former (e.g., a mold) is dipped into a coagulant solution and heat dried. Subsequently, the coagulant-coated former is dipped into the first latex blend composition. The latex film on the former is then coagulated by the coagulant to form a gel and complete setting of the gel is aided by heat (heat gellation) which also partially dries the gel. The gelled rubber covered former is dipped into the second latex blend composition and subsequently heat gelled and dried.

In embodiments where the elastomeric article has more than two layers, it is made by successively laminating one layer on top of another by dipping into the latex composition (and coagulant if necessary).

The multilayered latex article is then leached in water, heat dried and vulcanized to cure the article. After the curing step, the multilayered latex article is leached in water a second time. Lastly, the multilayered latex article is cooled and removed from the former. The gloves are inverted when removed from the former so as to orient the layer containing a majority of the elastomeric material toward the inner skin-contacting surface of the wearer and the layer containing a majority of the non-leachable polymeric antistatic agent toward the exterior environment. Variations of the basic process can be made. For example, the gloves may be beaded in an additional step after latex gelling and before the leaching step.

The donnability of the gloves may be enhanced by a chlorination step. The chlorination step may be used to produce a powder-free article. A powder-free glove as used herein is as defined in ASTM 6319-00a and has a powder residue limit of 2.0 mg/glove tested according to ASTM D6124. The chlorination step is interposed between the post-cure leaching and removal of the gloves from the former. In one particular embodiment, the removed gloves are turned inside out in a clean room environment to orient the skin-contacting layer toward the exterior of the gloves. The gloves are washed, chlorinated, and thorough washed again with clean water. The gloves are then dried, manually inverted, and dried a second time. Once the gloves have been dried a second time, they are then packaged. The techniques and equipment for the process are conventional and readily available to one skilled in the glove manufacturing field.

The antistatic gloves of the present invention provide the desirable properties of both of the polymers in the polymer blend (e.g., the antistatic properties of the non-leachable polymeric antistatic agent and the desirable comfort and feel properties of the elastomeric material). The desirable static decay time and surface resistivity values associated with the non-leachable polymeric antistatic agent are substantially maintained in the outermost layer/surface of gloves prepared according to the process described herein. The multilayer latex antistatic gloves also demonstrate improved delamination resistance due to chemical compatibility between the layers, and also provide the desirable soft feel simulating natural rubber for the innermost skin-contacting layer/surface.

Another advantage of the antistatic gloves and the process for making multilayered articles described herein is that lamination of the layers is based on the chemical compatibility of the first latex composition and the second latex composition and does not rely on the extent of gellation and the amount of water present in an intermediate latex gel. This allows for an easily controlled and more reliable lamination of the multilayered gloves and provides an improvement over the difficult and uncertain methods previously available.

An important aspect of the process described herein includes pre-blending the latex compositions, i.e., mechanically mixing the ingredients prior to latex coagulation or gelling. The pre-blending step further homogenizes the latex blend composition. Any blending method can be used for the pre-blending including, but not limited to, solvent-based blending, melting block blending, and latex blending. Furthermore, in the case of multilayered articles, the pre-blending of the latex ingredients enhances the chemical adherence between the different rubber layers formed according to the process, and reduces the likelihood of delamination.

Without being bound by any theory or mechanism, in one embodiment of the invention, the combination of desirable antistatic properties (i.e., surface resistivity and static decay times) and desirable comfort and feel properties of the gloves result from a migration of the non-leachable polymeric antistatic agent to the surface due to the immiscibility of the polymeric antistatic agent with the elastomeric material. It is understood that this combination of desirable antistatic and comfort properties may be achieved by other mechanisms.

EXAMPLES

The following non-limiting examples illustrate particular embodiments of the invention. The examples are not meant to be comprehensive of the entire scope of the invention.

Example 1: Comparative Static Testing of Gloves

Three types of glove samples were tested for static resistance properties and compared. The gloves were composed of:
1) 100% natural rubber;
2) 100% nitrile rubber; and
3) two layers, the outermost layer comprising 80% nitrile rubber and 20% natural rubber, laminated directly to an innermost layer comprising 80% natural rubber and 20% nitrile rubber prepared using the process described below.

For the two-layered glove, one glove sample was tested for static resistance properties. For 100% nitrile rubber gloves, eight different commercially available gloves and six different lab dipped gloves were each tested for static resistance properties (see Table 1). For 100% natural rubber gloves, different gloves were tested for static resistance properties. Each glove sample was tested for surface resistivity, volume resistivity and static decay time (SDT) as set forth above. For each glove sample, three specimens (prepared from three pieces of gloves) were tested and the results averaged. The surface resistivity and volume resistivity of each specimen was measured once. The SDT for each specimen was measured a total of six times. The SDT for each specimen was calculated averaging the SDT observed upon charging the specimen to +5000V three times, and to −5000V three times. As relative humidity affects the static resistance properties in an inversely proportional manner, the glove specimens were conditioned in a chamber at relative humidity of 12±3% and a temperature of 22±2° C. prior to taking and recording the measurements. The resistivity and SDT measurements were taken using the outer surface of the glove specimen.

A description of the 100% nitrile rubber gloves studied, and the static resistance properties of each, are detailed in Table 1.

in Table 2. The resistivity values of the 100% natural rubber glove(s) were always higher than the maximum range of the measuring equipment, which is greater than $10^{14}$ Ω/sq and $10^{14}$Ω.

TABLE 2

Resistivity and Static Decay Data

| Glove Sample Composition | Surface Resistivity (Ω/sq) | Volume Resistivity (Ω) | Static Decay Time (sec) |
|---|---|---|---|
| 100% Natural Rubber | >$10^{14}$ | >$10^{14}$ | >3,600 |
| 100% Nitrile Rubber | $6.1 \times 10^{12}$ to $1.4 \times 10^{14}$ | $7.4 \times 10^{11}$ to $1.6 \times 10^{13}$ | 4-37 |
| Outer Layer 80%/20% Nitrile Rubber/Natural Rubber Inner 80%/20% Natural Rubber/Nitrile Rubber | $1.7 \times 10^{13}$ | $2.3 \times 10^{12}$ | 27.2 |

As can be seen from the data in Table 2, the gloves of the present invention exhibit antistatic properties comparable to those of the 100% nitrile rubber gloves. This result is

TABLE 1

100% Nitrile Rubber Gloves and Static Resistance Properties

| Sample | Manufacturer | Catalog | Surface Resistance, ohms/sq cm | Volume Resistance, ohms | Static Decay Time, s | Remarks |
|---|---|---|---|---|---|---|
| Powder free Nitrile | Omigrace for Allegiance | 2Y1812/ N88001-041 | $6.12 \times 10^{12}$ | $7.38 \times 10^{11}$ | 4.28 | — |
| CR10 Nitrile | Smart Glove for Allegiance | 2Y1840T | $2.24 \times 10^{13}$ | $1.63 \times 10^{13}$ | 16.13 | Clean Room Gloves |
| CR10 Nitrile | Smart glove for Allegiance | 2Y1841T | $1.65 \times 10^{13}$ | $9.10 \times 10^{12}$ | 15.35 | Clean Room Gloves |
| CR10 Nitrile | Smart glove for Allegiance | 2Y1842T | $1.44 \times 10^{13}$ | $8.26 \times 10^{12}$ | 13.78 | Clean Room Gloves |
| CR10 Nitrile | Smart Glove for Allegiance | 2Y1842T | $1.93 \times 10^{13}$ | $2.59 \times 10^{12}$ | 24.5 | Clean Room Gloves |
| CR10 Nitrile | Allegiance | 2Y1841 | $1.80 \times 10^{13}$ | $8.29 \times 10^{12}$ | 8.71 | Clean Room Gloves |
| Powder free Nitrile | Ansell Edmont | Nitrilite 93-112 | $1.42 \times 10^{14}$ | $1.77 \times 10^{12}$ | 36.65 | Clean Room Gloves |
| Powder free Nitrile | Ansell Edmont | Nitrilite 93-112L | not measured | not measured | 27.51 | Clean Room Gloves |
| Lab dipped Powder free Nitrile #1 | N/A | N/A | $2.22 \times 10^{13}$ | $6.24 \times 10^{12}$ | 11.86 | Nitrile Latex: (ca. 39% acrylonitrile/ca. 58% butadiene/ca. 3% carboxylic acid) |
| Lab dipped Powder free Nitrile #2 | N/A | N/A | $4.17 \times 10^{13}$ | $5.06 \times 10^{12}$ | 7.62 | Nitrile Latex: (ca. 39% acrylonitrile/ca. 58% butadiene/ca. 3% carboxylic acid) |
| Lab dipped Powder free Nitrile #3 | N/A | N/A | $1.79 \times 10^{13}$ | $5.31 \times 10^{12}$ | 8.57 | Nitrile Latex: (39% acrylonitrile/58% butadiene/ca. 3% carboxylic acid) |
| Lab dipped Powder free Nitrile #4 | N/A | N/A | $4.32 \times 10^{13}$ | $4.49 \times 10^{12}$ | 9.93 | Reichhold Tylac 68073-06 (ca. 26% acrylonitrile) |
| Lab dipped Powder free Nitrile #5 | N/A | N/A | $7.78 \times 10^{13}$ | $6.56 \times 10^{12}$ | 15.12 | Nitrile Latex: (39% acrylonitrile/55% butadiene/6% carboxylic acid) |
| Lab dipped Powder free Nitrile #6 | N/A | N/A | $6.65 \times 10^{13}$ | $6.88 \times 10^{12}$ | 17.64 | Reichhold Noion 68083-00 |

The static resistance properties of the 100% natural rubber glove(s), the 100% nitrile rubber gloves, and the multilayered glove, are detailed in Table 2. The range of values for the 100% nitrile rubber gloves from Table 1 are summarized surprising because, as set forth below, the calculated theoretical values for SDT and surface resistivity for a layer composition composed of 80% nitrile rubber and 20% natural rubber are not these values.

100% pure nitrile rubber gloves exhibit a SDT of 4 to 37 seconds with 4 seconds as the best case scenario. A glove material containing 80% nitrile rubber would therefore be expected to have an SDT of 3.2 seconds. 100% natural rubber gloves exhibit a SDT of greater than 3,600 seconds with 3600 seconds as the best case scenario. A glove material containing 20% natural rubber would therefore be expected to have SDT of 720 seconds. Based on these calculations, the expected SDT value for 80% nitrile rubber and 20% natural rubber would be 3.2 seconds+720 seconds, or 723.2 seconds. Instead, the actual demonstrated SDT for this rubber layer was 27.2 seconds—significantly lower than expected.

The surface resistivity theoretical calculations differ from the actual measured values as well. 100% nitrile rubber gloves exhibited surface resistivity values ranging from $6.1 \times 10^{12}$ to $1.4 \times 10^{14}$ $\Omega$/sq. Assuming a best case of $6.1 \times 10^{12}$ $\Omega$/sq, an 80% nitrile rubber surface layer composition would be expected to contribute $4.88 \times 10^{12}$ $\Omega$/sq. 100% natural rubber exhibited a surface resistivity value of greater than $10^{14}$ $\Omega$/sq. Assuming a best case scenario, a 20% natural rubber surface layer would be expected to contribute more than $2 \times 10^{13}$ $\Omega$/sq. The calculated surface resistivity for a surface layer on a glove composed of 80% nitrile rubber and 20% natural rubber would be greater than $4.88 \times 10^{12} + 2 \times 10^{13}$ $\Omega$/sq, or $2.488 \times 10^{13}$ $\Omega$/sq. However, the actual received surface resistivity value was $1.7 \times 10^{13}$ $\Omega$/sq—lower than the expected best case value.

Examples 2-6: Detailed Preparation of Gloves

The method 100 used in preparing examples 2-7, comprises:
(1) preparing a latex composition composed of a majority of nitrile rubber for a first layer and a latex composition composed of a majority of natural rubber for a second layer,
(2) dipping and forming the gloves 200, and
(3) chlorinating the gloves 300 and making powder-free clean room gloves.

Preparation of Latex Compounds

Two latex compositions were prepared and blended, each comprising a nitrile rubber latex and a natural rubber latex. A first latex composition included a majority of a nitrile rubber latex and formed a first layer, the outer layer, of the antistatic glove. A second latex composition included a majority a natural rubber latex and formed a second layer, the inner donning side, of the antistatic glove.

First Latex Composition

Raw nitrile rubber latex (composed of about 39% acrylonitrile, about 58% butadiene, and about 3% carboxylic acid) was stirred with a mechanical stirrer (IKA Labortechnik RW20.n) at about 500 rpm and 0.30 phr of non-ionic surfactant Teric 320 was added to the stirred nitrile rubber latex to enhance its stability. The pH of the nitrile rubber latex was adjusted to about 9.5 using a 3% w/v potassium hydroxide solution and the nitrile rubber latex was additionally stirred for about 10 minutes.

Similarly, raw low ammonia natural rubber latex was stirred with a mechanical stirrer (IKA Labortechnik RW20.n) at about 500 rpm. A potassium hydroxide solution (0.5 phr) and an ammonium caseinate solution (0.20 phr) were sequentially added to the stirred natural rubber latex to enhance its stability. The natural rubber latex was further stirred for about 10 minutes.

The stabilized natural rubber latex was gradually added to the nitrile rubber latex while stirring the stabilized nitrile rubber latex. The percentage of nitrile rubber latex and the percentage of natural rubber latex as compared to the total composition are provided in Table 3. Subsequently, the nitrile rubber and natural rubber latex mixture was stirred with a mechanical stirrer for about 30 minutes. Other ingredients were added one at a time at about 10 minutes intervals in the order listed in Table 3. (i.e., sulfur dispersion followed by zinc dibutyldithiocarbamate (ZDBC) dispersion followed by zinc oxide (ZnO) dispersion, then Wingstay L dispersion and finally titanium dioxide ($TiO_2$) dispersion). Lastly, water was added to the mixture to dilute the latex to a total solids content (TSC) of about 20%.

Second Latex Composition

The second latex composition was prepared according to the formulation described in Table 3. In contrast to the process utilized to prepare the first latex composition, the stabilized nitrile rubber latex (minor component) was added to the stabilized natural rubber latex (major component) before the addition of other ingredients listed in Table 3. Water was added to this mixture to adjust the TSC to about 27%.

TABLE 3

Latex Compound Formulation

| Formulation | First dip compound | Second dip compound |
|---|---|---|
| Nitrile Rubber Latex (composed of about 39% acrylonitrile, about 58% butadiene, and about 3% carboxylic acid) | 51-95 | 5-49 |
| Teric 320 | 0.30 | 0.15 |
| KOH | adjust pH | |
| Raw Natural Rubber Latex | 5-49 | 51-95 |
| KOH | 0.50 | 0.50 |
| Ammonium Caseinate | 0.20 | 0.20 |
| Sulphur Dispersion | 2.00 | 1.00 |
| ZDBC Dispersion | 1.00 | 0.75 |
| ZnO Dispersion | 1.50 | 0.75 |
| Wingstay L Dispersion | 0.50 | 0.50 |
| $TiO_2$ Dispersion | 1.00 | 1.00 |
| TSC (%) | 20 | 27 |

Both the first and second latex compositions were matured at ambient temperature for about 24 hours, prior to dipping a latex article former and forming a multilayered latex article (e.g., gloves).

Five different gloves were prepared using combinations of a first dip composition and a second dip composition with different ratios of natural rubber and nitrile rubber latex blends (Examples 2-6). The compositions of Examples 2-6 are summarized in Table 4.

TABLE 4

Composition of the Examples

| | | Example | | | | |
|---|---|---|---|---|---|---|
| | | 2 | 3 | 4 | 5 | 6 |
| 1st dip composition | Nitrile rubber | 100 | 95 | 80 | 60 | 51 |
| | Natural rubber | 0 | 5 | 20 | 40 | 49 |
| 2nd dip composition | Nitrile rubber | 0 | 5 | 20 | 40 | 49 |
| | Natural rubber | 100 | 95 | 80 | 60 | 51 |

A two-layer powder-free antistatic glove with an outermost majority nitrile rubber layer and an innermost majority natural rubber layer was prepared as illustrated in FIG. 1. This process 100 involved making the gloves by a double dip coagulant dipping process 200 followed by chlorinating 300 and washing 400 the gloves as set forth below.

Dipping Procedure

A round ambidextrous glove former was washed thoroughly with detergent and water 202. The cleaned former was heated in an oven at 70° C. 204 until the former reached a temperature between 59-66° C. The heated former was dipped into a coagulant composition 206 (Table 5), which was maintained at a temperature between 53-59° C. The coagulant coated former was dried in the oven at 70° C. for 3-5 minutes 208, until the former reached a temperature between 53-58° C. The coagulant coated former was dipped into the first latex composition 210 for a dwell time of about 12-18 seconds. The dwell time in the first latex composition may be varied depending on the desired thickness of the first layer. Subsequently, the former was dried in the oven at 135° C. for 1 minute 212. The former was then dipped into the second latex composition 214 for a dwell time of about 5-10 seconds. Similar to forming the first layer, the dwell time in the second latex composition may be varied depending on the desired thickness of the second layer. The former covered with a wet gelled latex film was dried in the oven at 70° C. for 2 minutes 216 and then leached with hot tap water at 40° C. for 3 minutes 218. The leached latex film was manually beaded. The beaded latex film was dried and cured in the oven at 135° C. for 20 minutes 220. After curing the latex film in the oven, the former was cooled to ambient temperature 222. The formed glove was then removed from the former. Starch powder may be added to aid the removal of the glove from the former 224.

TABLE 5

Coagulant Composition

| Ingredients | % (wt/wt) |
|---|---|
| Water, Soft | 82.95 |
| Cellosize QP52,000 | 0.05 |
| Calcium nitrate | 12.00 |
| Calcium carbonate | 4.80 |
| Surfynol Tg | 0.20 |
| Total | 100.00 |

Specific gravity of coagulant = 1.080-1.090.

Chlorination Procedure

The formed gloves were chlorinated 300 under class 10 clean room environments to remove the powder (i.e., calcium carbonate and starch), thus producing powder-free clean room gloves, and to improve the donning characteristics of the gloves. First, the gloves were manually inverted 302 so that the majority natural rubber layer (i.e., the donning side of gloves) was on the exterior and exposed. The inverted gloves were loaded into a chlorinator and pre-rinsed with tap water for 15 minutes 304. The pre-rinsed gloves were then placed in a chlorine solution having a concentration of about 300 ppm for 35 minutes 306. The chlorinated gloves were rinsed with water for 15 minutes and rinsed again with water five (5) more times 308. The gloves were then manually inverted 310 so that the majority nitrile rubber layer was on the exterior.

The gloves were then chlorinated a second time using a similar process having the same pre-rinse 312, chlorinating 314 and post-rinse steps 316 as described above. After the second chlorination, the gloves were placed in a washer. First, the gloves were washed with water at ambient temperature for 15 minutes 402. Next, the gloves were washed using hot water at 80° C. for 1 hour 404. Then, the gloves were rinsed with water at ambient temperature for 15 minutes 406. The gloves were removed from the washer and dried in a tumbler dryer at 80° C. for 2.5 hours and cooled in the tumble dryer at ambient temperature for 30 minutes 408.

The gloves were then placed in a tumbler washer and washed for six (6) cycles at 40 minutes per cycle using de-ionized water 410. Water remaining in the gloves was extracted by centrifugal force, i.e., spinning the gloves in a water extraction machine for 15 minutes 412. Finally, the gloves were dried again in a tumbler dryer at 80° C. for 2.5 hours and cooled in the tumble dryer at ambient temperature for 30 minutes 414. The extensive washing protocol described above resulted in clean room gloves having a particle count of less than 6000 particles per square cm for particles greater than 0.5 μm. It should be noted cleaner gloves tend to exhibit higher surface resistivity values and higher static decay times.

Example 2

A multilayer nitrile/natural rubber latex laminate glove with an outer layer comprising 100% nitrile rubber latex and an inner layer comprising 100% natural rubber latex was prepared in a manner similar to the procedures described above. The first latex composition comprised 100% nitrile rubber latex (and 0% natural rubber latex) and the second latex composition comprised 100% natural rubber latex (and 0% nitrile rubber latex). This particular glove showed delamination of the two layers immediately after heat curing in the oven.

Example 3

A powder-free nitrile/natural rubber latex laminate glove comprising an outer layer having a composition of 95% nitrile rubber latex/5% natural rubber latex and an inner layer comprising a composition of 95% natural rubber latex/5% nitrile rubber latex was prepared in a manner similar to the procedures described above. The glove of Example 3 did not show any delamination of the two layers immediately after heat curing in the oven. However, some delamination of the two layers occurred after the glove was chlorinated. The glove of Example 3 exhibited a surface resistivity of $3.3 \times 10^{12}$ Ω/sq and a static decay time of 22 seconds (Table 6), and thus possessed antistatic properties. In addition, the glove demonstrated a modulus at 500% elongation of 3.6 MPa and an ultimate elongation of 609% (Table 6).

Example 4

A powder-free nitrile/natural rubber latex laminate glove comprising an outer layer having a composition of 80% nitrile rubber latex/20% natural rubber latex and an inner layer having a composition of 80% natural rubber latex/20% nitrile rubber latex was prepared in a manner similar to the procedures described above. The glove of Example 4 did not show any delamination of the two layers immediately after heat curing in the oven or after chlorination. The glove of Example 4 exhibited a surface resistivity of $1.7 \times 10^{13}$ Ω/sq and a static decay time of 27.2 seconds (Table 6), and thus possessed antistatic properties. In addition, the glove demonstrated a modulus at 500% elongation of 3.7 MPa and an ultimate elongation of 569% (Table 6).

Example 5

A powder-free nitrile/natural rubber latex laminate glove comprising an outer layer having a composition of 60% nitrile rubber latex/40% natural rubber latex and an inner layer having a composition of 60% natural rubber latex/40% nitrile rubber latex was prepared in a manner similar to the procedures described above. The glove of Example 5 did not show any delamination of the two layers immediately after heat curing in the oven or after chlorination. The glove of Example 5 exhibited a surface resistivity of $2.8 \times 10^{13}$ Ω/sq and a static decay time of 29.2 seconds (Table 6), and thus possessed antistatic properties. In addition, the glove demonstrated a modulus at 500% elongation of 4.2 MPa and an ultimate elongation of 569% (Table 6).

Example 6

A powder-free nitrile/natural rubber latex laminate glove comprising an outer layer having a composition of 51% nitrile rubber latex/49% natural rubber latex and an inner layer having a composition of 51% natural rubber/49% nitrile rubber was prepared in a manner similar to the procedures described above. The glove of Example 6 did not show any delamination of the two layers immediately after heat curing in the oven or after chlorination. The glove of Example 6 exhibited a surface resistivity of $3.0 \times 10^{13}$ Ω/sq and a static decay time of 34.0 seconds (Table 6), and thus possessed antistatic properties. In addition, the glove demonstrated a modulus at 500% elongation of 6.6 MPa and an ultimate elongation of 569% (Table 6).

TABLE 6

Properties of Gloves

| Glove Sample Composition | Example | Surface Resistivity (Ω/sq) | Volume Resistivity (Ω) | Static Decay Time (sec) | Ultimate Elongation (%) | Modulus at 500% Elongation (MPa) |
|---|---|---|---|---|---|---|
| Outer Layer 95% Nitrile Rubber/ 5% Natural Rubber Inner Layer 5% Nitrile Rubber/ 95% Natural Rubber | 3 | $3.3 \times 10^{12}$ | $1.47 \times 10^{14}$ | 21.8 | 609 | 3.6 |
| Outer Layer 80% Nitrile Rubber/ 20% Natural Rubber Inner Layer 20% Nitrile Rubber/ 80% Natural Rubber | 4 | $1.7 \times 10^{13}$ | $2.3 \times 10^{12}$ | 27.2 | 569 | 3.7 |
| Outer Layer 60% Nitrile Rubber/ 40% Natural Rubber Inner Layer 40% Nitrile Rubber/ 60% Natural Rubber | 5 | $2.8 \times 10^{13}$ | $3.9 \times 10^{12}$ | 29.2 | 569 | 4.2 |
| Outer Layer 51% Nitrile Rubber/ 49% Natural Rubber Inner Layer 49% Nitrile Rubber/ 51% Natural Rubber | 6 | $3.0 \times 10^{13}$ | $2.5 \times 10^{12}$ | 34.0 | 569 | 6.6 |

The invention has been described herein above with reference to various and specific embodiments and techniques. It will be understood that reasonable variations in said embodiments and techniques may be made without significantly departing from either the spirit or scope of the invention defined by the following claims.

What is claimed is:

1. An antistatic multilayered elastomeric article comprising:
   a) a first layer comprising a first blend of from about 65% wt to about 85% wt of a nitrile rubber as an antistatic agent and from about 15% wt to about 35% wt of a natural rubber, wherein the total amount of the nitrile rubber and the natural rubber is 100% wt of the first blend, and
   b) a second layer comprising a second blend of from about 65% wt to about 85% wt of the natural rubber and from about 15% wt to about 35% wt of the nitrile rubber as the antistatic agent, wherein the total amount of the nitrile rubber and the natural rubber is 100% wt of the second blend;
   wherein the first layer is an outer layer of the article;
   wherein the second layer is an inner layer of the article;
   wherein the first layer and the second layer are adjacent layers;
   wherein the first and the second layers do not delaminate upon stretching;
   wherein the article has a surface static resistivity of from about $10^9$ to about $3 \times 10^{13}$ Ω/sq and a static decay time of from about 21.8 to about 34 seconds; and
   wherein the nitrile rubber in the first layer and the nitrile rubber in the second layer is the only antistatic agent present in the article.

2. The elastomeric article of claim 1 wherein the article is a glove.

3. The elastomeric article of claim 1 wherein the article is a finger cot.

4. The elastomeric article of claim 1, wherein the article has an elastic modulus at 500% elongation of less than about 10 MPa.

5. The elastomeric article of claim 1, wherein the article has an elastic modulus at 500% elongation of less than about 7 MPa.

6. The elastomeric article of claim 1, wherein the article is chlorinated.

7. The elastomeric article of claim 1, further comprising at least one dispersion selected from the group consisting of a sulfur dispersion, a sulfur donor dispersion, a vulcanization accelerator dispersion, a zinc oxide dispersion, an antioxidant dispersion and a titanium dioxide dispersion.

8. The elastomeric article of claim 1, wherein the outer layer comprises about 80% wt of the nitrile rubber and about 20% wt of the natural rubber, wherein the total amount of the nitrile rubber and the natural rubber is 100% wt of the first blend.

9. The elastomeric article of claim 1, wherein the inner layer comprises about 80% wt of the natural rubber and about 20% wt of the nitrile rubber, wherein the total amount of the nitrile rubber and the natural rubber is 100% wt of the second blend.

10. The elastomeric article of claim 9, wherein the article has an elastic modulus at 500% elongation of less than about 7 MPa.

* * * * *